(12) United States Patent
Durand

(10) Patent No.: US 6,944,478 B1
(45) Date of Patent: Sep. 13, 2005

(54) SECURITY MODULE

(75) Inventor: Romain Durand, Paris (FR)

(73) Assignee: Alcatel, Paris (FR)

( * ) Notice: Subject to any disclaimer, the term of this patent is extended or adjusted under 35 U.S.C. 154(b) by 416 days.

(21) Appl. No.: 09/959,299

(22) PCT Filed: Jul. 7, 2000

(86) PCT No.: PCT/FR00/01984

§ 371 (c)(1),
(2), (4) Date: Apr. 18, 2002

(87) PCT Pub. No.: WO02/05511

PCT Pub. Date: Jan. 17, 2002

(51) Int. Cl.[7] .................................................. H04B 1/38

(52) U.S. Cl. ...................................... 455/558; 455/411

(58) Field of Search ................................ 455/558, 410, 455/411; 713/200; 709/200; 707/9; 235/382

(56) References Cited

U.S. PATENT DOCUMENTS

2003/0212890 A1 * 11/2003 Dircks et al. ............... 713/164

FOREIGN PATENT DOCUMENTS

| DE | 197 32 762 A1 | 11/1998 |
| DE | 197 28 004 A1 | 1/1999 |
| WO | WO 97/05729 | 2/1997 |

* cited by examiner

*Primary Examiner*—Lee Nguyen
(74) *Attorney, Agent, or Firm*—Sughrue Mion, PLLC

(57) ABSTRACT

The invention relates to a security module for authorizing an application to use software interfaces stored in a telecommunication terminal. The module (30) includes detector means for detecting the security profile of said telecommunication terminal, selector means for selecting from said software interfaces those which are associated with the detected security profile of the terminal, and access control means for controlling access to the software interfaces, on the one hand, to authorize the application to use the selected software interfaces and, on the other hand, to prohibit said application from using non-selected software interfaces.

16 Claims, 2 Drawing Sheets

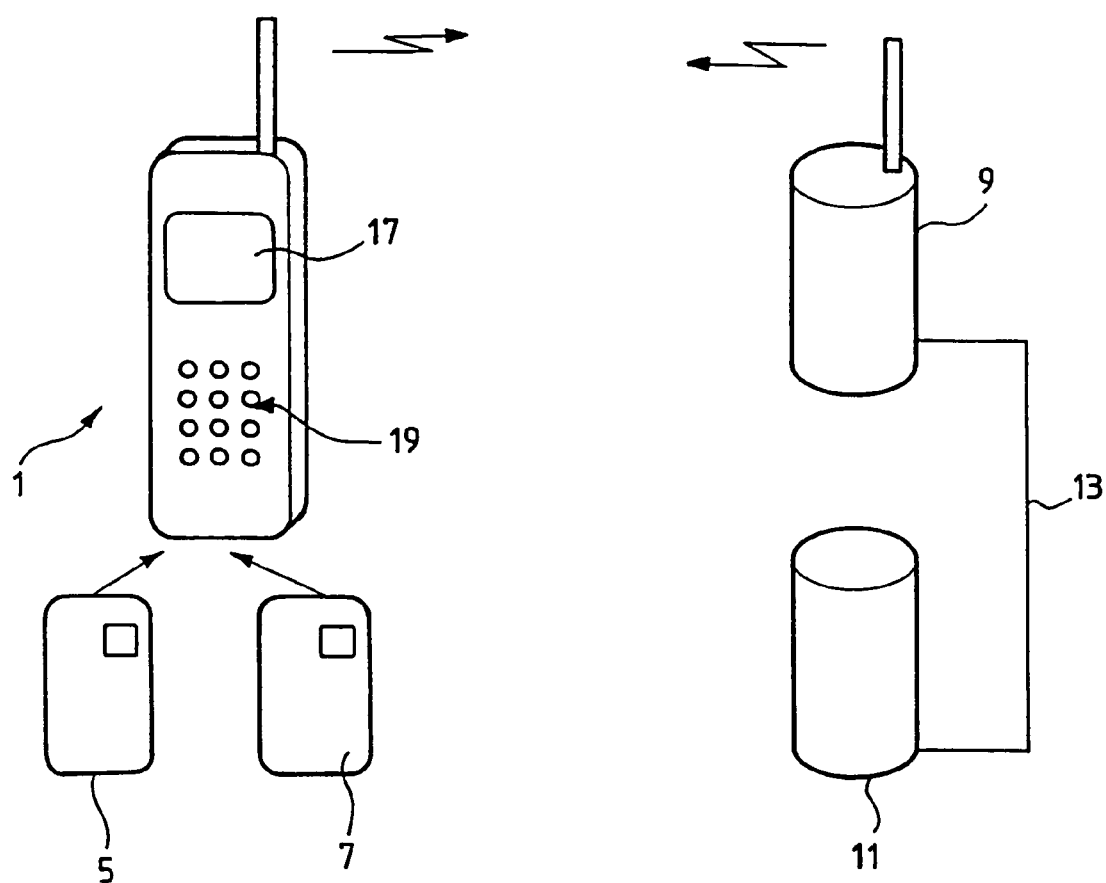

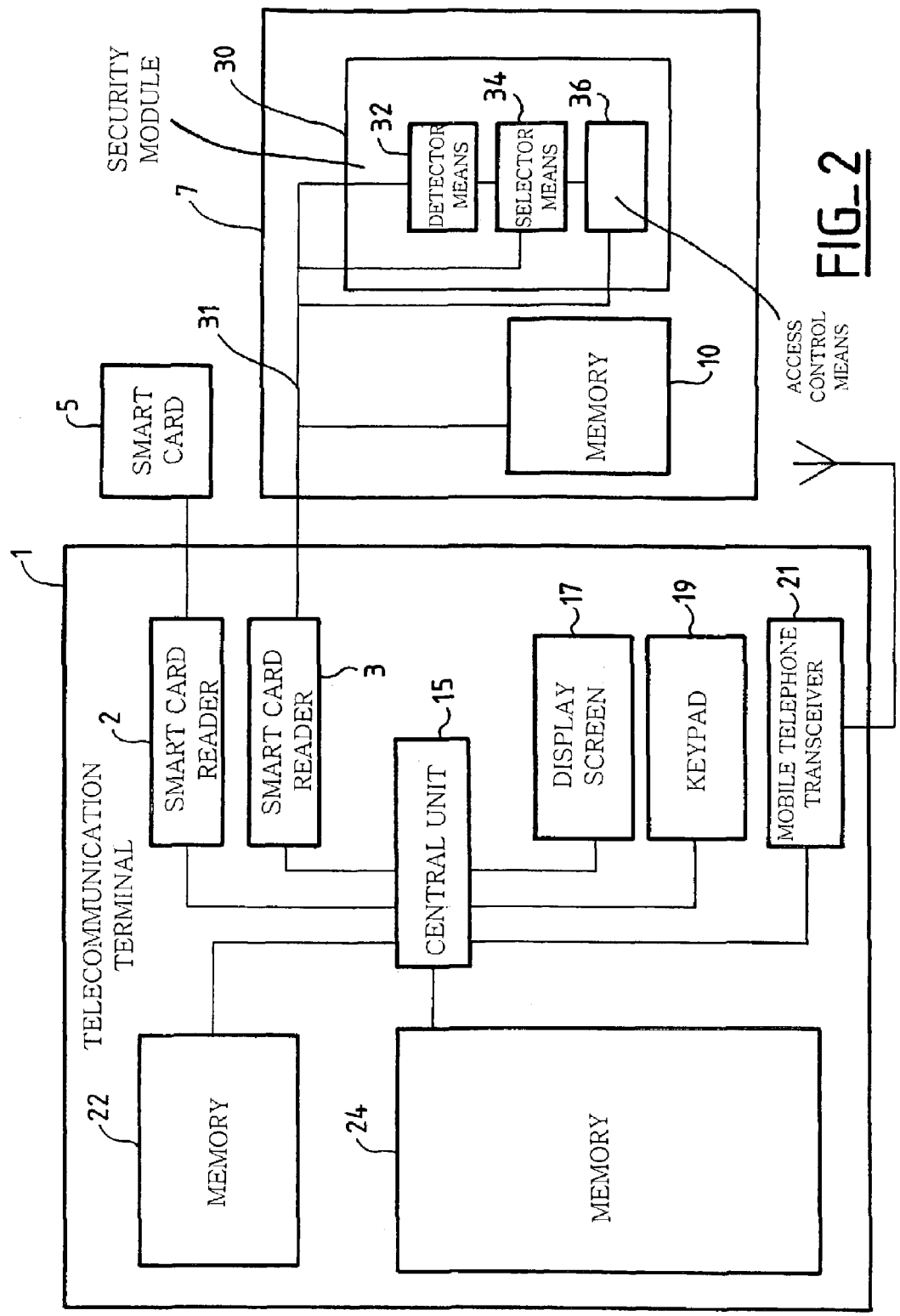
FIG_2

SECURITY MODULE

BACKGROUND OF THE INVENTION

The present invention relates to a security module for authorizing an application to use software interfaces stored in a telecommunication terminal.

The invention relates more generally to the field of secure access to an application, in particular a value added application, to technical resources of a telecommunication terminal, or to memories of a smart card inserted into a smart card reader of a telecommunication terminal.

Generally speaking, modern mobile telephones are not considered to have a sufficiently high security profile for financial transactions of all kinds, for example banking transactions or telepurchasing.

This is why any sensitive transaction implying a security function to prevent fraud is nowadays generally effected through the intermediary of a smart card inserted into the terminal.

In particular, for carrying out highly diverse transactions, it has been proposed to equip a mobile telephone with two smart card readers, one for receiving a subscriber identification module (SIM) card to enable a call to be set up with the telecommunication network, and the other for receiving an "application" smart card in which is stored particular user information relating to an application. For example, the application card is a bank card, an electronic purse, a loyalty card or a subscription card to a remote service that can be consulted via the telecommunication terminal.

However, the above solution is found to have drawbacks, in particular because of the limited technical resources that can be provided in a smart card.

Some more sophisticated applications are no longer compatible with the computation and memory capacity of a simple smart card and necessitate intervention by the technical resources of the mobile telephone, for example its computation means, memory means, keypad or display screen.

For effective fraud prevention, carrying out a sensitive transaction, such as a financial transaction, using the technical resources of a mobile terminal cannot be envisaged if the terminal does not have a suitable security profile.

To overcome this drawback, "fraud-proof" mobile telephones have been manufactured. These are terminals operating through security software layers and having at least one smart card reader, a protected keypad, a protected screen, and a tamperproof terminal casing that renders the terminal unusable in the event of an attempt to open the casing.

However, this solution cannot be extended to all terminals, in particular mobile terminals, because it is complex and costly.

As an alternative, it has been proposed to provide terminals having different levels of security against fraud.

For example, a level "0" security profile corresponds to a terminal having no technical means of security against fraud.

Level "1" corresponds, for example, to a terminal operating through security software layers protecting against fraud.

Level "2" corresponds to a level "1" terminal further including a smart card reader for receiving an application card. In the case of a mobile telephone, this would be a second smart card reader, the first one being that for receiving the subscriber identification module card (SIM card).

Level "3" corresponds to a level "2" terminal with the further feature that its keypad and display are protected against fraud. Protecting the keypad and the display is particularly important for displaying amounts to be paid and entering secret codes, for example.

Finally, level "4" corresponds to a fraud-proof terminal as described above, and thus to a level "3" terminal with the further feature of a tamperproof casing.

The level of security against fraud of a telecommunication terminal is determined by the manufacturer and implanted therein, for example in the form of an electronic certificate stored in a read-only memory (ROM).

If a sensitive application must be downloaded from a remote server, for example, the certificate and therefore the level of the security profile of the terminal are communicated to the remote server, which adapts the execution of the application to match the level of the security profile of the terminal.

However, this solution has the drawback that security against fraud cannot be really guaranteed during execution of the application in the terminal.

Thus it is possible, when a remote application is downloaded into a telecommunication terminal having a level "3" security profile, for another, "pirate" application to run in parallel and misappropriate the downloaded application.

Furthermore, in the general field of secure access to software modules in electronic data processing, libraries of software interfaces for access to a processor or a memory, for example, are sometimes used.

It is possible to enhance the level of security against fraud by inserting a secure interface for access to a processor, a memory or an external device, for example.

SUMMARY OF THE INVENTION

The present invention aims to alleviate the fraud problems of the prior art by proposing a security module that enhances security at the level of a telecommunication terminal during execution of an application therein.

To this end, the invention provides a security module for authorizing an application to use software interfaces stored in a telecommunication terminal, characterized in that it includes detector means for detecting the security profile of said telecommunication terminal, selector means for selecting from said software interfaces those which are associated with the detected security profile of the terminal, and access control means for controlling access to the software interfaces, on the one hand, to authorize the application to use the selected software interfaces and, on the other hand, to prohibit said application from using non-selected software interfaces.

Moreover, the security module can have one or more of the following features:

the access control means for controlling access to the software interfaces are additionally adapted to prohibit use of the software interfaces by any other application during the operations of said application, said application has a particular level of confidence, characterized in that said selector means are additionally adapted to select said software interfaces also as a function of the level of confidence of said predetermined application, the security module is included in a smart card, said application is associated with an accessory that can be connected to said telecommunication terminal, said accessory is a secure smart card reader having its own display screen and its own keypad, said application is downloaded from a remote server, said downloaded application is adapted to access the memories of a smart card inserted into a reader of said telecommunication terminal, and said application is an application for recrediting an electronic purse, a payment transaction or an application for crediting a smart card with loyalty points.

The invention also provides a telecommunication terminal characterized in that it includes a security module as described hereinabove.

The telecommunication terminal can further have one or more of the following features:

it includes a first smart card reader adapted to receive a subscriber identification module card and a second smart card reader adapted to receive a smart card incorporating a security module as described above, and it is a computer equipped with telecommunication means, a telephone, in particular a mobile telephone, preferably a cellular telephone, or a combined telephone network/Internet access terminal.

The invention further provides a method of authorizing secure use by an application of software interfaces stored in a telecommunication terminal, characterized in that it includes the following steps:

detecting the security profile of said telecommunication terminal, selecting those of said software interfaces that are associated with the detected security profile of the terminal, and controlling access to the software interfaces, on the one hand, to authorize the application to use the selected software interfaces and, on the other hand, to prohibit said application from using non-selected software interfaces.

The method according to the invention can further have one or more of the following features:

use of the software interfaces by any other application is prohibited during the operations of said application, and if said application has a particular level of confidence, the software interfaces are also selected as a function of the level of confidence of said application.

BRIEF DESCRIPTION OF THE DRAWINGS

Other features and advantages of the invention will emerge from the following description, which is given by way of non-limiting example and with reference to the accompanying drawings, in which:

FIG. 1 is a block diagram of a telecommunication system, and

FIG. 2 is a block diagram of a telecommunication terminal equipped with a security module according to the invention.

FIG. 1 is a simplified block diagram of a telecommunication system and FIG. 2 is a more detailed block diagram of the telecommunication terminal 1 from FIG. 1.

The expression "telecommunication terminal" means any terminal equipment of a telecommunication network, for example a mobile telephone a cellular telephone, or a computer equipped with telecommunication means, such as a modem, for accessing a telecommunication network.

The expression "telecommunication terminal" also encompasses a Minitel terminal and a combined telephone network/Internet access terminal. A combined access terminal of this kind, also known as a "screenphone", is marketed by the applicant in the form of its "WEB TOUCH™" product.

DETAILED DESCRIPTION OF THE INVENTION

It is considered hereinafter that the telecommunication terminal 1 is a mobile telephone, as shown diagrammatically in FIG. 1.

The telecommunication terminal 1 includes a first smart card reader 2 and a second smart card reader 3 (see FIG. 2).

The first smart card reader 2 is adapted to receive a subscriber identification module (SIM) card 5 enabling it to communicate with a telecommunication network. The SIM card 5 can have the format of a credit card, as shown in FIG. 1, or it can be a "micro-SIM" card.

Thanks to the SIM card 5, the user can identify himself to a server 9 of the telephone network operator with whom the user has an account and make and receive calls. The server 9 includes a database of all users and authorizations to access the telephone network of the operator through the intermediary of SIM cards.

The smart card reader 3 is adapted to receive an "application" smart card 7. Particular user information relating to an application, for example a remote application, is stored in a memory 10 in this kind of application card 7 (see FIG. 2). In the case of an electronic purse, for example, the credit on the card is stored in the memory 10.

The card 7 preferably has the format of a credit card, but it can also have the format of a micro-SIM card. The application card 7 can be an electronic purse, a card for crediting loyalty points, or a bank card, for example.

Thanks to the application card 7, the user of the terminal 1 can download one or more applications from a remote application server 11 belonging to a company selling products or to a bank with which the user of the terminal 1 has a bank account, for example.

The user can call the server 11 from his mobile telephone. In this case, the server 9 of the telephone operator 9 is connected to the server 11 of the bank, for example via a telephone line connection 13.

Refer now to FIG. 2.

The telecommunication terminal 1 is equipped with a central unit 15 for managing the terminal 1. The central unit 15 includes a microprocessor, for example.

The terminal 1 further includes, connected to the central unit 15, a display screen 17, a keypad 19, and telecommunication means 21 taking the form in this example of a mobile telephone transceiver.

The smart card readers 2 and 3 are also connected to the central unit 15 and the operations of reading and writing the smart cards 5 and 7, respectively, are managed through the intermediary of the central unit 15.

The terminal 1 also includes a certificate memory 22. The memory 22 contains an electronic certificate issued by a certification organization and is connected to the central unit 15. The electronic certificate includes a unique identification number of the terminal 1, its security level, and an electronic signature of the certification organization. The memory is preferably a mask-programmed read-only memory (ROM) installed in the terminal 1 by the manufacturer so that its content cannot be modified after it is installed in the terminal 1.

The terminal 1 further includes a memory 24 containing a software interface library. The memory 24 is advantageously also a mask-programmed read-only memory (ROM) installed in the terminal 1 by the manufacturer. It contains software interfaces for communicating with the smart card 7 via the reader 3, for example, for a remote application loaded into the central unit 15 to access the screen 17 or the keypad 19, or to communicate with an external accessory connected to the terminal 1, such as a secure external smart card reader (not shown) having its own display screen and its own keypad, both protected against fraud.

The software interface library of the memory 24 contains interfaces of different levels. The library of the memory 24 has two interface levels, for example a high level and a low level.

A high-level interface is a software interface that executes complex functions without providing access to the basic functions of the module or of the accessory with which it is communicating.

By analogy, a low-level interface provides access to the basic functions of the module or the accessory with which it is communicating.

Consider, for example, software interfaces for accessing an application card 7 such as an electronic purse, in which case one high-level software interface is the function "debit electronic purse by an amount X", for example. This software interface cannot access and freely modify memory locations of the smart card forming the electronic purse. A low-level interface for the same application card includes the function of freely changing certain bits in the memory of the card 7, for example.

Access to the memory of the application card via a high-level interface is restricted and therefore protected to some extent.

On the other hand, access to the memory via a low-level interface is not restricted and therefore more vulnerable to fraud.

To expand the field of application of the telecommunication terminal 1 as much as possible, it is necessary for both high-level interfaces and low-level interfaces to be available, as a function of the security level of the terminal 1.

To this end, the application card 7 includes a security module 30 in accordance with the invention, in addition to the memory 10 for information relating to an application.

The security module 30 includes, connected by a data bus 31 of the card 7 to the reader 3 of the terminal 1, detector means 32 for detecting the security profile of said telecommunication terminal, selector means 34 for selecting at least one interface level associated with the detected security profile of the terminal 1, and control means 36 for controlling access to the software interfaces stored in the memory 24 of the terminal.

The means 32, 34 and 36 are described in more detail hereinafter.

The detector means 32 are adapted to detect, for example by exchanging encryption keys, the certificate stored in the certificate memory 22 by accessing the memory 22 via the reader 3 and the central unit 15. Of course, the detector means 32 also include means for verifying the authenticity of the certificate detected.

The selector means 34 can access the memory 24 containing the software interfaces. The selector means 34 receive an output signal from the detector means 32 that is representative of the security level of the telecommunication terminal 1, as detected by the means 32.

Each software interface is advantageously associated with a security profile level of a telecommunication terminal 1.

In the case of the software interfaces relating to an electronic purse, for example, no software interface of the memory 22 is associated with a security profile of level "0" or "1" because using an electronic purse necessitates an additional smart card reader. Thus a terminal having a level "0" or "1" security profile cannot be used with an electronic purse.

For a level "2" security profile terminal, i.e. a level "1" telecommunication terminal having an additional smart card reader (like the smart card reader 7), a high-level software interface having the function of being able to debit the electronic purse by an amount subject to a ceiling is provided, for example. That interface can therefore be used with all downloaded remote applications and involving the payment of a sum of money, for example telepurchasing of cinema tickets.

However, for transaction security reasons, no software interfaces are provided for terminals of level "2" and below, enabling the electronic purse to be recredited, since recrediting an electronic purse implies the use of low-level software interfaces.

To recredit his electronic purse, the user of a level "2" security profile telecommunication terminal must therefore use another telecommunication terminal having a higher level security profile or an automatic teller machine of a bank provided for this purpose.

Low-level software interfaces for recrediting electronic purses from a remote application server 11 of a bank are associated with terminals having a level "3" or higher security profile, and therefore terminals additionally having a keypad and a display screen protected against fraud.

As a function of the result of the detection of the certificate by the means 32, the means 34 therefore select for the application loaded into the central unit 15, from the software interfaces of the memory 24, those which are associated with the security profile level of the telecommunication terminal.

In an advantageous embodiment, the selector means 34 receive from the central unit via the data bus 31 a signal representative of the level of confidence of the application loaded into the central unit 15.

The level of confidence of a program indicates the degree of protection of the program against fraud, for example by encryption.

The higher the level of confidence of the software, the better the protection of the software against fraud.

Taking this parameter into account is advantageous because, to increase further security against fraud, provision can be made for an application having a low level of confidence not to be able to access software interfaces normally provided for a security level of the telecommunication terminal.

The access control means 36 receive from the selector means 34 a signal representative of the selected software interfaces. The means 36 are adapted, on the one hand, to authorize an application downloaded into the central unit 15 from the remote server 11, for example, to use the selected software interfaces and, on the other hand, to bar said application from using non-selected software interfaces. Also, the means 36 are adapted, during the operations of said application previously cited, to prohibit use of the software interfaces by any application other than the application loaded into the central unit 15.

It is therefore through the action of the security module 30 as a whole and that of the access control means 36 in particular that secure access to an application card 7, for example, is guaranteed.

An example relating to an electronic purse is described hereinafter to illustrate how the security module according to the invention works when paying for a purchase with an electronic purse, for example.

A user wishes to purchase cinema tickets through the intermediary of his mobile telephone, which has two smart card readers and a level "2" security profile, as defined in the preamble of this description. To this end, he dials a telephone number to load from a remote server of a cinema chain an application for selecting the film, where and at what time it is being shown, and the number of tickets to be purchased, and to pay for the tickets.

Then, to pay for the tickets, a software interface of the memory 24 is needed to communicate with the electronic purse 7, because the payment operation uses the technical resources of the terminal, namely the screen 17, in particular to display the amount to be paid, and the keypad 19, to validate the payment.

Consequently, before the payment operation can take place, the security module 30 in the card 7 defines and guarantees access to the interfaces of the memory 24.

To this end, via the smart card reader 3, the detector means 30 detect and verify the certificate loaded into the certification memory 22 and transmit the result to the selector means 34.

As the security level of the telecommunication terminal 1 is not very high, the selector means 34 choose in the memory 24 a high-level software interface denoted "debit electronic purse", for example. That software interface in particular enables the purse to be debited by an amount up to a particular ceiling by decrementing the amount of money stored in the memory 10, displaying the amount to be debited on the screen of the terminal, and validating payment of that amount by pressing a key on the keypad.

The access control means 36 enable the application to access the software interface mentioned above.

At the same time, when executing the second application, the access control means 36 prohibit use by the second application of other, non-selected interfaces contained in the memory 24, like the low-level interfaces. Also, the means 36 block access to the software interfaces contained in the memory 24 for all applications other than the "debit electronic purse" application.

Of course, using a software interface of the memory 24 is obligatory for accessing the memory 10 of the electronic purse 7.

Accordingly, it will be understood that the security module contained in the electronic purse guarantees access to the memories of that smart card and the level of the security profile of the telecommunication terminal.

On the other hand, if the user wishes to use his level "2" security profile terminal to access a remote server of his bank to recredit his electronic purse, he could load the application into the central unit 15, but he could not then execute it, because the security module 30 would prohibit access to the software interfaces necessary for the recrediting operation, because of the insufficiently high security level of the terminal.

That user would therefore have to recredit his electronic purse either using a terminal having a security profile of the required level for the remote application to be able to access the software interfaces necessary for the application to function, or using an automatic teller machine of his bank provided for that purpose, for example.

In to the foregoing description, the application is downloaded from a remote server. However, the application could, of course, equally be one associated with an accessory connected to the telecommunication terminal.

Thus for a mobile telephone having only one smart card reader intended to receive a subscriber identification module card, for example, the accessory could be a secure external smart card reader, for example, in particular an application card reader. This kind of external reader preferably has its own display screen and its own keypad, both protected against fraud.

According to a further feature of the invention, the security module is incorporated in the telecommunication terminal or in the SIM card 5.

What is claimed is:

1. A security module (30) for authorizing an application to use software interfaces stored in a telecommunication terminal (1), characterized in that it includes detector means (32) for detecting the security profile of said telecommunication terminal (1), selector means (34) for selecting from said software interfaces those which are associated with the detected security profile of the terminal (1), and access control means (36) for controlling access to the software interfaces, on the one hand, to authorize the application to use the selected software interfaces and, on the other hand, to prohibit said application from using non-selected software interfaces.

2. A security module according to claim 1, characterized in that the access control means (36) for controlling access to the software interfaces are additionally adapted to prohibit use of the software interfaces by any other application during the operations of said application.

3. A security module according to claim 2, wherein said application has a particular level of confidence, characterized in that said selector means (34) are additionally adapted to select said software interfaces also as a function of the level of confidence of said predetermined application.

4. A security module according to claim 1, wherein said application has a particular level of confidence, characterized in that said selector means (34) are additionally adapted to select said software interfaces also as a function of the level of confidence of said predetermined application.

5. A security module according to claim 4, characterized in that it is included in a smart card (7).

6. A security module according to claim 1, characterized in that it is included in a smart card (7).

7. A security module according to claim 6, characterized in that said application is associated with an accessory that can be connected to said telecommunication terminal.

8. A security module according to claim 6, characterized in that said application is downloaded from a remote server.

9. A security module according to claim 1, characterized in that said application is associated with an accessory that can be connected to said telecommunication terminal.

10. A security module according to claim 9, characterized in that said accessory is a secure smart card reader having its own display screen and its own keypad.

11. A security module according to claim 1, characterized in that said application is downloaded from a remote server.

12. A security module according to claim 11, characterized in that said downloaded application is adapted to access the memories of a smart card inserted into a reader (3) of said telecommunication terminal (1).

13. A security module according to claim 12, characterized in that said application is an application for recrediting an electronic purse, a payment transaction or an application for crediting a smart card with loyalty points.

14. A telecommunication terminal (1), characterized in that it includes a security module according to claim 1.

15. A telecommunication terminal according to claim 14, characterized in that it includes a first smart card reader (2)

adapted to receive a subscriber identification module card (5) and a second smart card reader (3) adapted to receive a smart card (7) incorporating a security module.

16. A telecommunication terminal according to claim 14, characterized in that it is a computer equipped with telecommunication means, a telephone, in particular a mobile telephone, preferably a cellular telephone, or a combined telephone network/Internet access terminal.

* * * * *